US012522539B2

(12) United States Patent
Tamburini et al.

(10) Patent No.: US 12,522,539 B2
(45) Date of Patent: Jan. 13, 2026

(54) GEOPOLYMER MATERIAL FOR PANELS

(71) Applicant: Consiglio Nazionale delle Ricerche, Rome (IT)

(72) Inventors: Sergio Tamburini, Rome (IT); Marco Natali, Rome (IT); Matteo Panizza, Rome (IT); Enrico Garbin, Rome (IT); Giovanni Ferrarini, Rome (IT); Paolo Bison, Rome (IT); Alessandro Bortolin, Rome (IT)

(73) Assignee: Consiglio Nazionale delle Ricerche, Rome (IT)

( * ) Notice: Subject to any disclaimer, the term of this patent is extended or adjusted under 35 U.S.C. 154(b) by 273 days.

(21) Appl. No.: 18/013,425

(22) PCT Filed: Jul. 2, 2021

(86) PCT No.: PCT/IB2021/055946
§ 371 (c)(1),
(2) Date: Dec. 28, 2022

(87) PCT Pub. No.: WO2022/003637
PCT Pub. Date: Jan. 6, 2022

(65) Prior Publication Data
US 2023/0242445 A1    Aug. 3, 2023

(30) Foreign Application Priority Data
Jul. 3, 2020 (IT) .................. 102020000016138

(51) Int. Cl.
*C04B 28/00* (2006.01)
*C04B 14/10* (2006.01)
(Continued)

(52) U.S. Cl.
CPC .......... *C04B 28/008* (2013.01); *C04B 14/106* (2013.01); *C04B 18/067* (2013.01);
(Continued)

(58) Field of Classification Search
CPC ... C04B 28/008; C04B 14/106; C04B 18/067; C04B 18/08; C04B 18/167;
(Continued)

(56) References Cited

U.S. PATENT DOCUMENTS 9,902,650 B2    2/2018  Guerini et al.
2017/0342654 A1*  11/2017  Okamura .............. C04B 18/022
(Continued)

FOREIGN PATENT DOCUMENTS

CN    105948596    9/2016
CN    106396596    2/2017
(Continued)

OTHER PUBLICATIONS

Search Report, Written Opinion dated Nov. 23, 2021; Application No. PCT/IB2021/055946; 15 pages.

*Primary Examiner* — Amber R Orlando
*Assistant Examiner* — Jeffrey Eugene Barzach
(74) *Attorney, Agent, or Firm* — RANKIN, HILL & CLARK LLP; Erik J. Overberger

(57) ABSTRACT

A geopolymeric material is described having compressive strength at 28 days ranging from 15 to 100 N/mm², obtainable by curing for 12 hours at a temperature ranging from 20° C. to 60° C., from a geopolymeric aqueous mixture comprising the following inorganic components in the following parts by dry mass:
 metakaolin 15-65
 potassium silicate and/or sodium silicate 20-40
 aggregates recycled from CDW (Construction and Demolition Waste) 5-300;
 said geopolymeric aqueous mixture is obtainable by mixing 20-175 parts by mass of water with said inorganic components, and has a viscosity at 23° C. between 100 and 10000 Pa·s, wherein:
(Continued)

i) the viscosity is measured via Brookfield methodology,
ii) the aggregates recycled from CDW belong to one or more of the classes 17.01.01, 17.01.02, 17.01.03, 17.01.07 according to the European Waste Catalogue,
iii) the aggregates recycled from CDW have a grain size less than or equal to 4 mm, preferably less than or equal to 2 mm.

10 Claims, 4 Drawing Sheets

(51) Int. Cl.
| | | |
|---|---|---|
| *C04B 18/06* | (2006.01) | |
| *C04B 18/08* | (2006.01) | |
| *C04B 18/167* | (2023.01) | |
| *C04B 111/00* | (2006.01) | |
| *C04B 111/34* | (2006.01) | |
| *E04F 13/08* | (2006.01) | |
| *E04F 13/14* | (2006.01) | |
| *F24D 3/12* | (2006.01) | |

(52) U.S. Cl.
CPC ............ *C04B 18/08* (2013.01); *C04B 18/167* (2013.01); *E04F 13/0875* (2013.01); *E04F 13/14* (2013.01); *F24D 3/122* (2013.01); *C04B 2111/00612* (2013.01); *C04B 2111/34* (2013.01); *C04B 2201/52* (2013.01)

(58) Field of Classification Search
CPC ....... C04B 2111/00612; C04B 2111/34; C04B 2201/52; C04B 2111/28; C04B 14/40; C04B 14/42; C04B 14/46; C04B 14/48; C04B 16/06; C04B 18/141; C04B 18/16; C04B 24/04; E04F 13/0875; E04F 13/14; F24D 3/122; Y02P 40/10; Y02W 30/91
See application file for complete search history.

(56) References Cited

U.S. PATENT DOCUMENTS

| | | |
|---|---|---|
| 2018/0156551 A1 | 6/2018 | Guarrero |
| 2020/0031717 A1 | 1/2020 | Gong et al. |
| 2022/0002610 A1* | 1/2022 | Melbouci ............... C09K 8/602 |
| 2023/0111461 A1* | 4/2023 | Valcke .................. C04B 18/165 |
| | | 52/612 |

FOREIGN PATENT DOCUMENTS

| | | | |
|---|---|---|---|
| WO | WO-2013190565 A2 * | 12/2013 | ............ B09B 3/00 |
| WO | WO 2015020612 | 2/2015 | |
| WO | WO-2019115634 A1 * | 6/2019 | ........... C04B 28/006 |

* cited by examiner

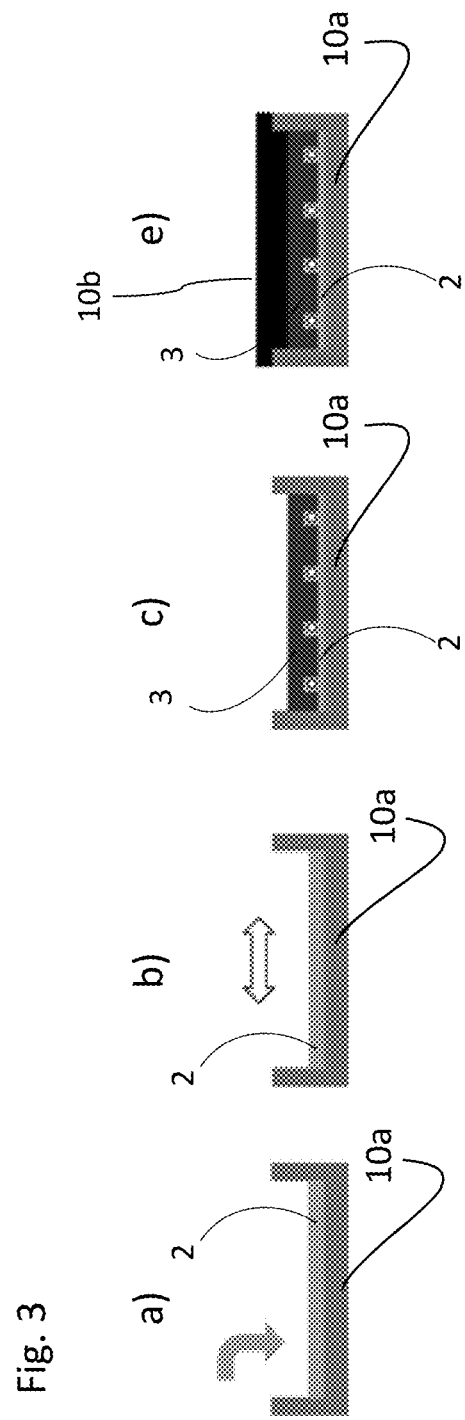

GEOPOLYMER MATERIAL FOR PANELS

TECHNICAL FIELD

The present invention relates to a geopolymeric aqueous mixture for obtaining a geopolymeric material similar to a mortar usable for construction applications. The geopolymeric material cured and obtained from this aqueous mixture for maturation is useful in building components and design elements, such as panels for creating ventilated façades or for hydronic heating/cooling.

BACKGROUND ART

Materials used in the construction sector, such as geopolymeric materials, generally based on metakaolin and comprising mineral aggregates such as sand, gravel or clay, are known in the state of the art.

CN 106396596 A discloses an inorganic fire retardant material for building applications comprising 50 to 94% inorganic mineral powder, fibres (such as cellulose, polypropylene, polyvinyl chloride, and glass fibres), fillers, and a binder.

CN 105948596 A discloses an ecological cement mixture in which 100 parts solid powder, 100-400 parts aggregates, 1-50 parts liquid raw materials and 1-10 parts additive are present. In particular, the solid powders comprise one or more components among fly ash, calcined kaolin, silicoaluminates and slag, while the aggregates are recycled aggregates from construction and/or recovery waste. The liquid raw material instead includes sodium silicate, alkali metal hydroxides and water.

US 2020/031717 A1 discloses a concrete in geopolymeric material capable of storing thermal energy. Such a material comprises at least one binder, an alkaline activator, an aggregate with high conductivity and thermal capacity, and at least one coarse aggregate with high conductivity and thermal capacity.

U.S. Pat. No. 9,902,650 B2 discloses a building material with a controllable slump. The material comprises a binder comprising fly ash, an alkaline activator, sand and fine and coarse aggregates, organic acids or organic acid conjugates.

Problems of the Prior Art

Disadvantageously, such mineral aggregates are obtained by extraction from quarries, river beds or other, with processes which require long times, substantial costs and consumption of non-renewable resources.

SUMMARY OF THE INVENTION

In this context, the technical task underlying the present invention is to provide a geopolymeric aqueous mixture for obtaining a geopolymeric material which overcomes the drawbacks of the above-mentioned prior art.

In particular, it is an object of the present invention to provide an aqueous mixture for obtaining an environmentally sustainable geopolymeric material which is capable of providing good mechanical and thermal performance for the production of building components and design elements.

It is a further object of the present invention to provide a geopolymeric mixture which is economical and easy to produce.

The technical task and the specified objects are substantially achieved starting from a geopolymeric aqueous mixture comprising the following inorganic components in the following parts by dry mass:

metakaolin 15-65
potassium silicate and/or sodium silicate 20-40
aggregates recycled from CDW (Construction and Demolition Waste) 5-300;
said geopolymeric aqueous mixture being obtainable by:
mixing 20-175 parts by mass of water with said inorganic components, said geopolymeric aqueous mixture having a viscosity at 23° C. between 100 and 10000 Pa·s.

As used herein, viscosity is understood to be measured at 23° C. via Brookfield methodology. In particular, the viscosity was measured via Brookfield rotational viscometer model DV2™, provided with 6 spindles with adjustable speeds between 0.1 and 200 rpm, applying a torque between 10 and 90%. The above-mentioned viscometer is calibrated over a measurement range between $0.100$-$40 \cdot 10^3$ Pa·s, or $100$-$40 \times 10^3$ cP. The amount of mixture sample analysed is 200 ml. The viscosity values are reported in a later part of the present disclosure.

In fact, starting from said mixture it is possible to obtain a geopolymeric material with excellent mechanical properties.

A further object of the present invention is therefore the cured geopolymeric material obtained by means of:
curing the aforementioned geopolymeric aqueous mixture for 12 hours at a temperature ranging from 20° C. to 60° C., said geopolymeric material characterized in that it has a compressive strength at 28 days ranging from 15 to 100 $N/mm^2$.

Such a geopolymeric mixture solves the technical problem in that it comprises recycled aggregates, for example from the demolition of buildings.

DESCRIPTION OF THE FIGURES

FIG. 3 shows different steps of a production process of the panel of FIGS. 1 and 2;

FIG. 5 shows different steps of a production process of the panel of FIG. 4a;

DETAILED DESCRIPTION OF THE INVENTION

Figure 1:
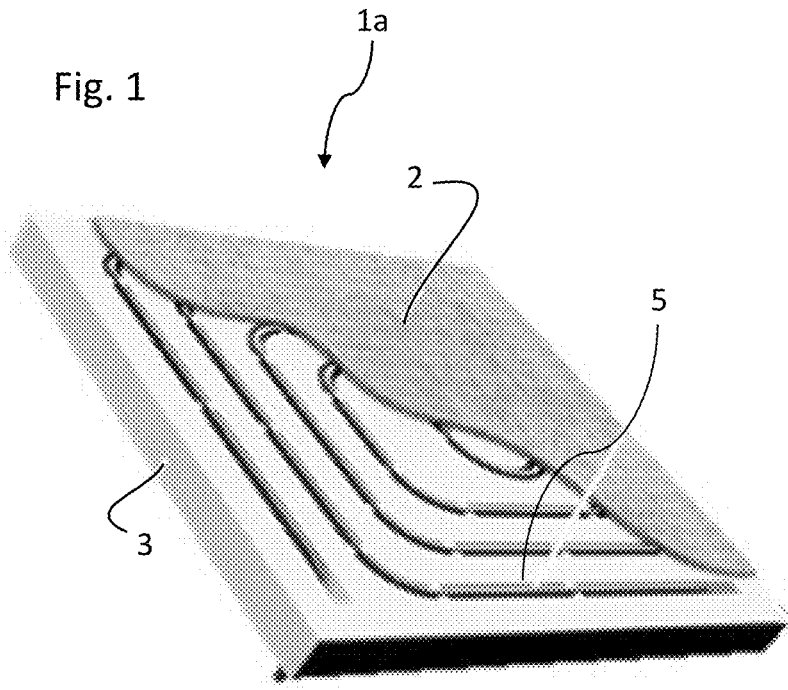
FIG. 1 shows a first embodiment of a panel according to the present invention.

For the purposes of the present invention the definitions "comprising" and "containing" do not exclude the presence of further components beyond those expressly listed after such a definition, while the definitions "consisting of" and "consisting in" exclude the presence of additional components beyond those expressly listed after such a definition.

The various components present in the geopolymeric aqueous mixture in accordance with the present invention will be hereinafter referred to as parts by mass. It should be noted that the sum of the parts by dry mass of binder (i.e., metakaolin, potassium silicate and/or sodium silicate and other reagents specified below, such as blast furnace slag, fly ash and sodium citrate) is 100, to which up to 300 parts of aggregate correspond. In other words, the weight ratio of the total binder to the aggregate can be up to 1:3. In fact, this ratio is typical, as is known to those skilled in the art, of a cement mortar.

The metakaolin is powdered, and preferably has a particle size such that $D_{50}$ is less than or equal to 20 microns.

The potassium silicate and/or the sodium silicate are in aqueous solution, in which the mass concentration is preferably between 40% and 50%.

Preferably, the $SiO_2/K_2O$ molar ratio in the potassium silicate and/or the $SiO_2/Na_2O$ molar ratio in the sodium silicate is between 1.3 and 2.6.

It should be noted in this regard that it is known to those skilled in the art to identify a silicate by two features, namely the molar ratio $SiO_2/K_2O$ or $SiO_2/Na_2O$ (in the case of potassium or sodium silicate, respectively) and the mass concentration. The latter is deductible from the ratio between the amount of silicate and the sum of the amounts of silicate and solvation water, indicated below in the present disclosure.

Preferably the composition of the aqueous mixture object of the invention has a viscosity between 120 and 3000 Pa·s.

Preferably, in accordance with the present invention, the aggregates recycled from CDW are derived from construction and demolition waste and comprise non-hazardous inorganic, cement and/or ceramic and/or glass materials. Generally, the aggregates recycled from CDW belong to one or more of the classes 17.01.01, 17.01.02, 17.01.03, 17.01.07 according to the European Waste Catalogue.

The aggregates recycled from CDW are ground so as to have a resulting particle size less than or equal to 4 mm, preferably less than or equal to 2 mm.

The processability of the geopolymeric aqueous mixture can be varied as a function of different parameters. The geopolymeric aqueous mixture can further optionally comprise up to 60 parts by mass of blast furnace slag. Preferably, the blast furnace slag has a particle size such that $D_{50}$ is less than or equal to 20 microns.

Optionally, the geopolymeric aqueous mixture comprises up to 25 parts by dry mass of fly ash.

Preferably, the fly ash has a particle size such that $D_{50}$ is less than or equal to 20 microns.

Optionally, the geopolymeric aqueous mixture can comprise up to 25 parts by mass of sodium citrate.

Preferably, the blast furnace slag and/or fly ash are replaced from 5 to 15 parts with sodium citrate. Thereby, it is possible to increase the working time at room temperature up to 2-4 hours, but the compressive strength is reduced by up to 15-20%.

Preferably, the fly ash is class F, i.e., it is fly ash with low CaO content. In fact, with this type of ash the working time of the geopolymeric mixture is increased. Using up to 25 parts of Class F fly ash, the working time is one hour or more at room temperature (23-25° C.). In this case the geopolymeric aqueous mixture can cure at a lower temperature, i.e., 20° C. In accordance with the present invention, the curing occurs in air.

The initial temperature of the inorganic components also influences the working time, which in particular increases by decreasing such a temperature.

In the absence of class F fly ash and with an initial temperature of metakaolin, potassium silicate and/or sodium silicate and CDW recycled aggregates of 8-10° C., the working time increases from less than 10 minutes for a temperature of 28-30° C. to values greater than 45 minutes.

According to an embodiment, the aggregates recycled from CDW mainly comprise bricks. Advantageously, the mechanical strength improves with the same total water content. The thermal conductivity of the cured geopolymeric material in which the CDW aggregates comprise only bricks is between 0.6 and 0.7 W $m^{-1}K^{-2}$.

According to an alternative embodiment, the aggregates recycled from CDW mainly comprise concrete. In this case, the thermal conductivity of the cured geopolymeric material in which the aggregates recycled from CDW comprise only concrete is between 0.8 and 0.9 W $m^{-1}K^{-2}$.

Preferably, the geopolymeric mixture comprises silica sand and/or quartz sand and/or mineral fillers or other aggregates having high thermal conductivity. Advantageously, the cured geopolymeric material exhibits a thermal conductivity between 1 and 2 W $m^{-1}K^{-2}$.

Optionally, the geopolymeric mixture can also comprise mineral fillers, for example wollastonite and/or feldspar. Advantageously, the mechanical behaviour and thermal performance of the cured geopolymeric material improve.

To counteract the effects of shrinkage or to improve the tensile behaviour following cracking of the cured geopolymeric material, optionally, the aqueous mixture comprises a volume percentage between 0.2% and 3% of polymeric and/or metallic and/or mineral fibres.

Preferably, the polymeric fibres are made of one or more of polypropylene, polyvinyl alcohol, polyacrylonitrile.

Preferably, the metallic fibres are made of steel, preferably stainless steel.

Preferably, the mineral fibres are alkali resistant and are made of basalt or glass or a combination of the two.

A preferred embodiment of the cured geopolymeric material, a further object of the present invention, has a compressive strength at 28 days between 35 and 40 $N/mm^2$ and a drying shrinkage of less than 0.22% after 6 months, and is obtained by curing for 12 hours at 50° C. an aqueous mixture (I) having a viscosity at 23° C. between 100 and 150 Pa·s, a working time at 23° C. of not less than 70 min and consisting of metakaolin:blast furnace slag:fly ash:potassium silicate:CDW:Total $H_2O$ in the corresponding parts by mass 34:23:11:31:93:38, in which the molar ratio Si/Al~2.2, and the molar ratio K/Al~0.80, in which the potassium silicate has a molar ratio $SiO_2/K_2O=1.9$ and a solvation water content of 38 parts by mass and the CDW is mixed and consists predominantly of concrete and bricks with a particle size ranging from 1 to 2 mm and from 0 to 1 mm, with the two particle size fractions mixed in a mass proportion between 3:2 and 2:1.

This material is in particular used as a material for hydronic radiant panels adapted for heating and cooling.

In particular, such panels comprise a layer of geopolymeric material.

Figure 2:
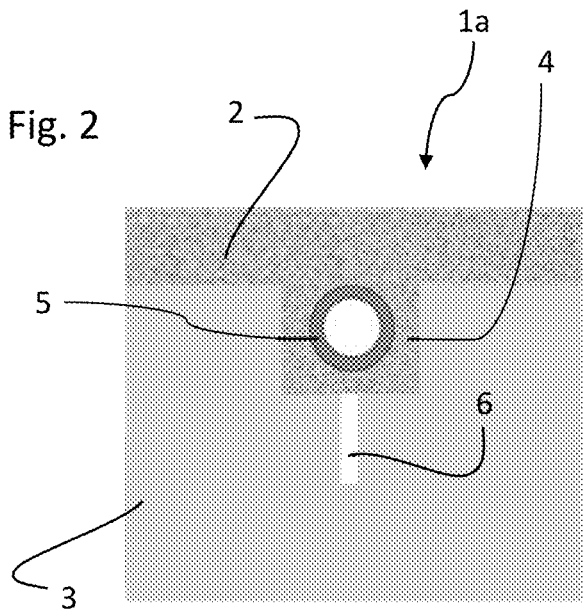
FIG. 2 shows a schematic representation of a section of the panel of FIG. 1.

A preferred form of said panel is in particular depicted in FIGS. 1 and 2 and relates to a panel 1*a* comprising a layer of geopolymeric material 2 obtained by the process below. Preferably, said layer of geopolymeric material 2 has a thickness greater than or equal to 5 mm.

Optionally, as a safety measure and to improve the behaviour upon impact and to external actions in general, the geopolymeric layer 2 can incorporate a first reinforcing element, for example a metallic or mineral or polymeric mesh of appropriate weight. Preferably, the panel 1*a* comprises an insulating layer 3 adjacent to the layer of cured geopolymeric material 2. For example, the insulating layer 3 is made of high-density expanded polystyrene. Alternatively, the insulating layer 3 is made with organic and/or inorganic foams and/or other various kinds of insulating materials.

The layer which remains visible once the panel 1*a* is installed is the layer of geopolymeric material 2.

In particular, the insulating layer 3 comprises a plurality of channels 4. Such channels 4 face the layer of geopolymeric material 2. In particular, the cured geopolymeric material 2 fills at least in part the channels 4. Preferably, the cured geopolymeric material 2 completely fills the channels 4.

The channels 4 house a plurality of pipes 5 for the flow of a service fluid. Such pipes 5 comprise, for example, small cross-linked polyethylene pipes comprising an oxygen diffusion barrier layer. Preferably, such small pipes have an external diameter of 10 mm.

The pipes 5 can have a spiral, coil or grid arrangement and are in contact with the cured geopolymeric material.

Preferably, the insulating layer 3 comprises small vent channels 6 fluidly connected to said channels. The small vent channels 6 are in particular obtained inside the channels 4 and extend inside the insulating layer 3 in the opposite direction to the layer of geopolymeric material 2. Such small vent channels 6 are functional to the expulsion of air during the production step of the panel 1a and have smaller dimensions than the dimensions of the channels 4.

The panel 1a is in particular prepared with a process which comprises the following steps, also shown in FIG. 3:
 a) casting the geopolymeric aqueous mixture (I) into a mould 10a to make a geopolymeric aqueous mixture layer;
 b) vibrating the mould 10a containing the geopolymeric aqueous mixture layer to promote the elimination of trapped air;
 c) applying by pressure the insulating layer 3 on the geopolymeric aqueous mixture layer;
 d) vibrating the whole to allow proper filling of the spaces; during this step the geopolymeric aqueous mixture layer inserts in the channels 4 of the insulating layer 3, surrounding the pipes 5 containing the service fluid, but not in the small vent channels 6. Preferably, the dimensions of the small vent channels 6 are such as not to allow the entry of geopolymeric aqueous mixture therein;
 e) covering by exerting a pressure on said insulating layer 3 with a suitable cover element 11a to close the mould 10a and relative sealing of said mould 10a in a watertight container;
 f) letting the geopolymeric aqueous mixture cure in the mould 10a closed for a time between 12 and 24 hours at 50° C., preferably 12 hours;
 g) detaching the panel 1a from the mould 10a and letting the panel 1a cure in a 100% RH environment for a time not exceeding 7 days, preferably between 3 and 5 days.

Optionally, before step a), an insert, for example in plastic or rubber, comprising a particular texture may be applied on the bottom of the mould 10. Thereby, the geopolymeric mixture layer, curing, gives rise to a layer of geopolymeric material 2 on which the texture of the insert is imparted. In accordance with such an embodiment, step g) also comprises removing the insert when detaching the panel 1a from the mould 10a.

Optionally, prior to step c), the process comprises a further step in which the first reinforcing element is positioned.

Another preferred embodiment of the cured geopolymeric material, a further object of the present invention, has a compressive strength at 28 days between 70 and 80 N/mm² and a drying shrinkage of less than 0.12% after 3 months, and is obtained by curing for 12 hours at 30° C. a thixotropic aqueous mixture (I) with viscosity at 23° C. between 2000 and 5000 Pa·s and consisting of metakaolin:blast furnace slag:fly ash potassium silicate:CDW:Total H$_2$O=37:37:0:27:100: [32-41] in which the molar ratio Si/Al~2.3 and the molar ratio K/Al~0.75, in which the potassium silicate has a molar ratio SiO$_2$/K$_2$O=1.9 and a solvation water content of 32 parts by mass and the CDW has a particle size of less than 2 mm.

Another preferred embodiment of the cured geopolymeric material, a further object of the present invention, has a compressive strength at 28 days between 85 and 95 N/mm² and is obtained by curing for 12 hours at 30° C. a thixotropic aqueous mixture (III) with a viscosity at 23° C. between 2000 and 5000 Pa·s consisting of metakaolin:blast furnace slag:fly ash:potassium silicate:CDW:Total H$_2$O in parts by weight respectively of 38:38:0:24:70:[30-36], in which the molar ratio Si/Al~2.0, and the molar ratio K/Al~0.75, in which the potassium silicate has a molar ratio SiO$_2$/K$_2$O=1.4 and a solvation water content of 30 parts by mass, in which the CDW has a particle size of less than 2 mm.

Figure 4A:
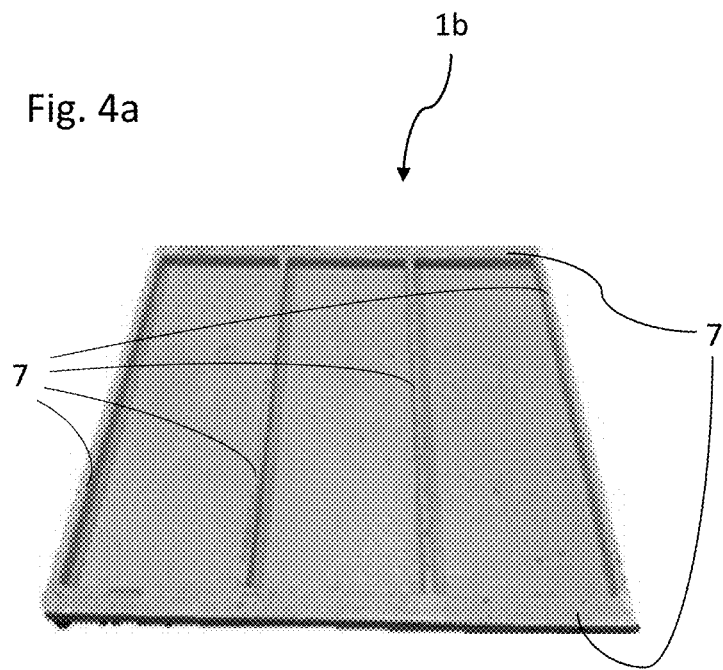
FIG. 4a shows a second embodiment of a panel according to the present invention and FIG. 4b shows a shaped element for obtaining such a panel.

With particular reference to FIG. 4a, the present invention also relates to a panel 1b for ventilated façades.

Both of the above-described cured geopolymeric materials, i.e., obtained from the geopolymeric aqueous mixtures (II and III), can be used in such a panel 1b for ventilated façades.

The panel 1b consists of the geopolymeric material obtained by curing the geopolymeric aqueous mixture (II or III). In other words, the panel 1b comprises a single layer of geopolymeric material 2.

Preferably, the layer of geopolymeric material 2 has a thickness between 5 and 10 mm.

According to a preferred embodiment, the panel 1b comprises horizontal and vertical ribs 7 obtained in the layer of geopolymeric material 2. Such ribs 7 have a structural reinforcing function.

Optionally, as a safety measure and to improve the behaviour upon impact and to external actions in general, the geopolymeric layer 2 can incorporate a first reinforcing element, for example a metallic or mineral or polymeric mesh of appropriate weight.

Figure 4B:
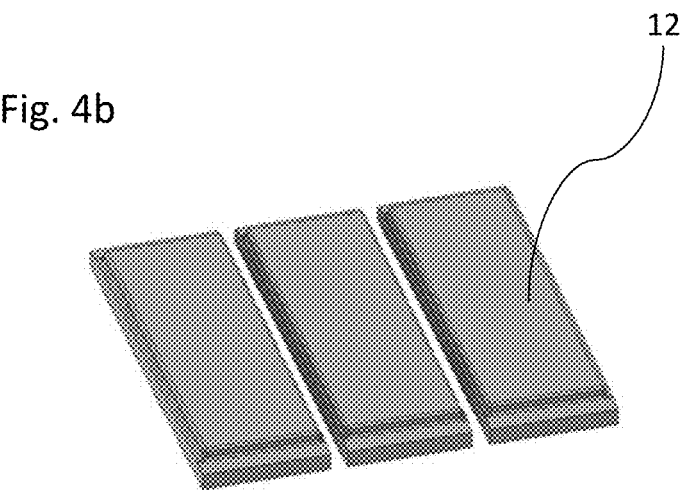
Figure 5:
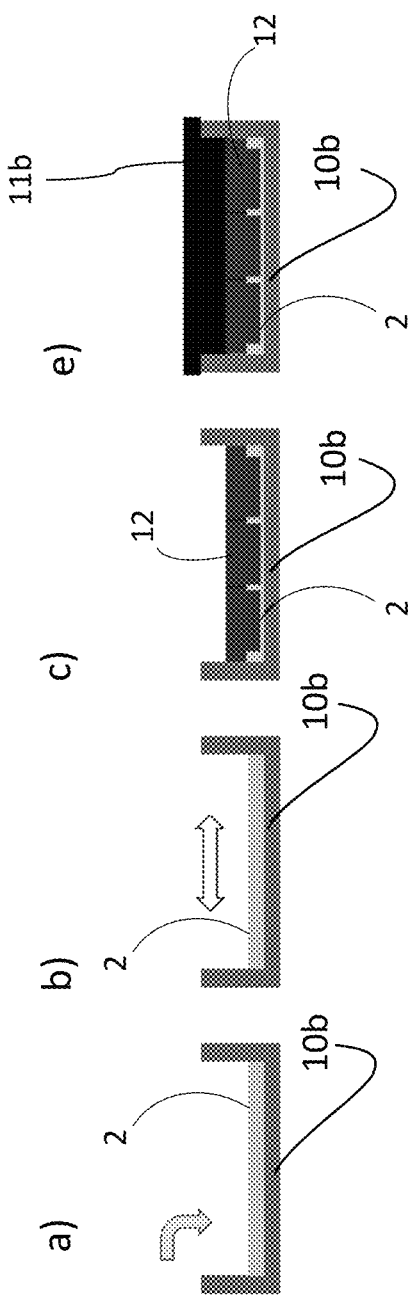

To further improve the resistance to external actions, the geopolymeric layer 2 can incorporate a second reinforcing element at the ribs 7. The second reinforcing element is for example a profile, or a plurality of profiles, suitably sized to stay inside said ribs 7. Such a profile can be hollow or solid, of a metallic or polymeric or mineral nature. The preparation process of such a panel 1b for ventilated façades comprises the following steps shown in FIG. 5:
 a) casting the above-mentioned aqueous mixture (II) or the aqueous mixture (III) into a mould 10b to make a layer of said geopolymeric aqueous mixture;
 b) vibrating the mould 10b containing the geopolymeric aqueous mixture layer to promote the elimination of trapped air;
 c) applying by pressure a shaped element 12 capable of imparting the desired shape to the panel 1b. Specifically, the shaped element 12, shown in FIG. 4b, comprises the negative of the ribs 7 which is to be imparted on the panel 1b;
 d) vibrating the whole to allow proper filling of the spaces;
 e) covering by exerting a pressure on said insulating layer with a suitable cover element 11b to close the mould 10b and relative sealing in a watertight container;
 f) letting the geopolymeric aqueous mixture cure in the mould 10b closed for a time between 12 and 24 hours at 30° C., preferably for 12 hours;
 g) removing the shaped element 12 and the panel 1b from the mould 10b and allowing the panel 1b to cure in a 100% RH environment for a time not exceeding 7 days, preferably between 3 and 5 days.

Optionally, prior to step c), the process comprises a further step in which the first reinforcing element is positioned.

Optionally, prior to step e), the process comprises a further step in which the second reinforcing element is positioned.

Experimental Tests

The viscosity values measured via Brookfield methodology at 23° C. for some geopolymeric aqueous mixture compositions in accordance with the present invention are shown in the table below.

| MIX-TURE | Speed rpm | Brookfield visc. Pa · s | Mixture composition MK:SL:FA:Ksil: CDW:Total $H_2O$ | Solvation water |
|---|---|---|---|---|
| Mixture 1 | 1.0 | $1.2\text{-}1.5 \times 10^2$ | 34:23:11:31:93:38 | 38 |
| Mixture 2 | 0.2 | $4.3\text{-}4.7 \times 10^2$ | 34:23:11:31:93:38 | 38 |
|  | 1.0 | $1.8\text{-}2.3 \times 10^2$ |  |  |
| Mixture 3 | 0.2 | $1.3\text{-}3.1 \times 10^3$ | 37:37:0:27:99:33 | 32 |
| Mixture 4 | 0.2 | $0.7\text{-}3.0 \times 10^3$ | 37:37:0:27:99:34 | 32 |
| Mixture 5 | 0.2 | $0.6\text{-}0.7 \times 10^3$ | 37:37:0:27:99:36 | 32 |
| Mixture 6 | 0.2 | $1.0\text{-}1.9 \times 10^3$ | 37:37:0:27:98:40 | 32 |
| Mixture 7 | 0.2 | $1.0\text{-}2.0 \times 10^3$ | 37:37:0:27:99:42 | 32 |
| Mixture 8 | 0.2 | $0.7\text{-}1.4 \times 10^3$ | 37:37:0:27:99:43 | 32 |

In which MK:metakaolin; SL:blast furnace slag; FA:fly ash; Ksil:potassium silicate; CDW:recycled aggregates CDW; $H_2O$:total water.

Practical Manufacturing Example of Hydronic Radiant-Type Heating/Cooling Panel

The panel 1a has for example dimensions 600×600 mm$^2$.

The panel 1a contains approximately 5.9 m of cross-linked polyethylene pipes with an oxygen barrier layer. The outer diameter of the pipes is 9.9 mm, with a pipe wall thickness of 1.1 mm. The pipes 5 are spirally arranged with an average distance of about 50 mm between portions of adjacent pipes. The layer of geopolymeric material 2 has a thickness of 6-7 mm, of which the coating layer of the pipes is not less than 3 mm. The insulating layer 3 is made of EPS with a density of 30 kg/m$^3$ and a thickness of 50 mm. The curing of the aqueous mixture (I) envisages a period of 12 hours at 50° C. with the mould 10a closed. The layer of geopolymeric material 2 is then removed from the mould 10a and let cure in an environment at 100% RH for a time between 3 and 5 days.

The invention claimed is:

1. A geopolymeric aqueous mixture comprising the following inorganic components in the following parts by dry mass:
    metakaolin 15-65
    potassium silicate and/or sodium silicate 20-40
    aggregates recycled from Construction and Demolition Waste (CDW) 5-300
    blast furnace slag 0-60
    fly ash 0-25
    sodium citrate 0-25,
    said geopolymeric aqueous mixture being obtained by:
    mixing 20-175 parts by mass of water with said inorganic components, said geopolymeric aqueous mixture having a viscosity at 23° C. between 100 and 10000 Pa·s, wherein i) viscosity is measured via Brookfield methodology,
ii) said aggregates recycled from CDW belong to one or more of the classes 17.01.01, 17.01.02, 17.01.03, 17.01.07 according to the European waste catalogue, said aqueous geopolymeric mixture being selected from the following ones:
an aqueous geopolymeric mixture (1):
    having: a viscosity at 23° C. between 100 and 150 Pa·s, a working time at 23° C. of not less than 70 min;
    and consisting of metakaolin:blast furnace slag:fly ash:potassium silicate CDW:Total $H_2O$ in the corresponding parts by mass 34:23:11:31:93:38, wherein the molar ratio Si/Al~2.2 and the molar ratio K/Al~0.80, wherein the potassium silicate has a molar ratio $SiO_2/K_2O$=1.9 and a solvation water content of 38 parts by mass and the CDW is a blend consisting of concrete and bricks with a particle size of 1 to 2 mm and 0 to 1 mm, with the two particle size fractions mixed in a mass proportion between 3:2 and 2:1, respectively;
a thixotropic aqueous geopolymeric mixture (II):
    with viscosity at 23° C. between 2000 and 5000 Pa·s and
    consisting of metakaolin:blast furnace slag:fly ash:potassium silicate CDW:Total $H_2O$ in parts by weight respectively of 37:37:0:27:100:32-41 wherein the molar ratio Si/Al~2.3 and the molar ratio K/Al~0.75, wherein the potassium silicate has a molar ratio $SiO_2/K_2O$=1.9 and a solvation water content of 32 parts by mass and the CDW has a particle size of less than 2 mm; and
a thixotropic aqueous geopolymeric mixture (III):
    with viscosity at 23° C. between 2000 and 5000 Pa·s
    consisting of metakaolin:blast furnace slag:fly ash:potassium silicate:CDW:Total $H_2O$ in parts by weight respectively of 38:38:0:24:70:30-36 wherein the molar ratio Si/Al~2.0 and the molar ratio K/Al~0.75, wherein the potassium silicate has a molar ratio $SiO_2/K_2O$=1.4 and a solvation water content of 30 parts by mass and wherein the CDW has a particle size of less than 2 mm.

2. The geopolymeric aqueous mixture of claim 1, wherein the blast furnace slag and fly ash have a particle size such that D50 is less than or equal to 20 microns.

3. The geopolymeric aqueous mixture according to claim 1, further comprising a percentage by volume between 0.2% and 3% of polymeric and/or metallic and/or mineral fibres.

4. A geopolymeric material obtained by curing the aqueous mixture (I) according to claim 1, wherein the geopolymeric material has a compressive strength at 28 days ranging from 35 to 40 N/mm$^2$ and a drying shrinkage of less than 0.22% after 6 months obtained by curing for 12 hours at 50° C.

5. A geopolymeric material obtained by curing the aqueous mixture (II) according to claim 1, wherein the geopolymeric material has a compressive strength at 28 days ranging from 70 to 80 N/mm$^2$ and a drying shrinkage of less than 0.12% after 3 months obtained by curing at 30° C. for 12 hours.

6. A geopolymeric material obtained by curing the aqueous mixture (III) according to claim 1, wherein the geopolymeric material has a compressive strength at 28 days ranging from 85 to 95 N/mm$^2$ obtained by curing at 30° C. for 12 hours.

7. A panel consisting of the geopolymeric material according to claim 5.

8. The geopolymeric aqueous mixture of claim 1, wherein said aggregates recycled from CDW have a grain size less than or equal to 2 mm.

9. A panel comprising:
   a layer consisting of the geopolymeric material of claim 4,
   an insulating layer adjacent to said cured geopolymeric material layer, said insulating layer comprising:
      a plurality of channels facing the geopolymeric material layer and housing a plurality of pipes for the flow of a service fluid,
      small vent channels fluidly connected to said channels.

10. A panel consisting of the geopolymeric material according to claim 6.

* * * * *